US009163964B2

(12) United States Patent
Schneider et al.

(10) Patent No.: US 9,163,964 B2
(45) Date of Patent: Oct. 20, 2015

(54) DEVICE FOR DETECTING AT LEAST ONE FLOW CHARACTERISTIC OF A FLUID MEDIUM

(71) Applicant: Robert Bosch GmbH, Stuttgart (DE)

(72) Inventors: Norbert Schneider, Tiefenbronn (DE); Eckart Reihlen, Stuttgart (DE); Uwe Konzelmann, Asperg (DE); Michael Rittmann, Ditzingen (DE); Lutz Westenberger, Remseck (DE); Hans Beyrich, Freiberg/N (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/732,670

(22) Filed: Jan. 2, 2013

(65) Prior Publication Data

US 2013/0174654 A1    Jul. 11, 2013

(30) Foreign Application Priority Data

Jan. 5, 2012    (DE) .......................... 10 2012 200 121

(51) Int. Cl.
*G01F 1/00* (2006.01)
*G01F 1/684* (2006.01)
*G01F 5/00* (2006.01)
*F02D 41/18* (2006.01)
*F02D 41/28* (2006.01)

(52) U.S. Cl.
CPC ................ *G01F 1/00* (2013.01); *G01F 1/6842* (2013.01); *G01F 5/00* (2013.01); *F02D 41/18* (2013.01); *F02D 2041/285* (2013.01)

(58) Field of Classification Search
CPC ...... F02D 2041/285; F02D 41/18; G01F 1/00; G01F 1/6842; G01F 5/00
USPC ................. 73/114.34, 202.5, 204.11, 204.15, 73/204.17, 204.23
See application file for complete search history.

(56) References Cited

U.S. PATENT DOCUMENTS

| 6,964,710 | B2 | 11/2005 | Hecht et al. | |
|---|---|---|---|---|
| 7,739,908 | B2 * | 6/2010 | Wienand et al. | 73/204.26 |
| 7,966,877 | B2 * | 6/2011 | Renninger et al. | 73/204.26 |
| 7,980,126 | B2 * | 7/2011 | Opitz et al. | 73/204.26 |
| 8,448,508 | B2 * | 5/2013 | Schneider et al. | 73/204.26 |
| 2008/0066541 | A1 * | 3/2008 | Burton | 73/204.15 |
| 2008/0264166 | A1 * | 10/2008 | Wienand et al. | 73/204.26 |
| 2009/0211355 | A1 * | 8/2009 | Renninger et al. | 73/204.26 |
| 2009/0282909 | A1 * | 11/2009 | Wienand et al. | 73/204.26 |
| 2011/0259097 | A1 * | 10/2011 | Mais et al. | 73/204.25 |
| 2013/0269419 | A1 * | 10/2013 | Etherington et al. | 73/37 |
| 2013/0283895 | A1 * | 10/2013 | Etherington et al. | 73/114.34 |

FOREIGN PATENT DOCUMENTS

DE    102 32 072    2/2004

* cited by examiner

*Primary Examiner* — Freddie Kirkland, III
(74) *Attorney, Agent, or Firm* — Kenyon & Kenyon LLP

(57) ABSTRACT

A device for detecting at least one flow characteristic of a fluid medium, in particular for detecting an air mass flow in the intake air of a motor vehicle, includes at least one flow channel, through which the fluid medium may flow, and at least one sensor element, which is situated in the flow channel, for detecting the flow characteristic. The sensor element has at least one heating element. The device includes at least one bidirectional electrical interface. The device is configured to receive information and transmit information via the bidirectional electrical interface.

7 Claims, 1 Drawing Sheet

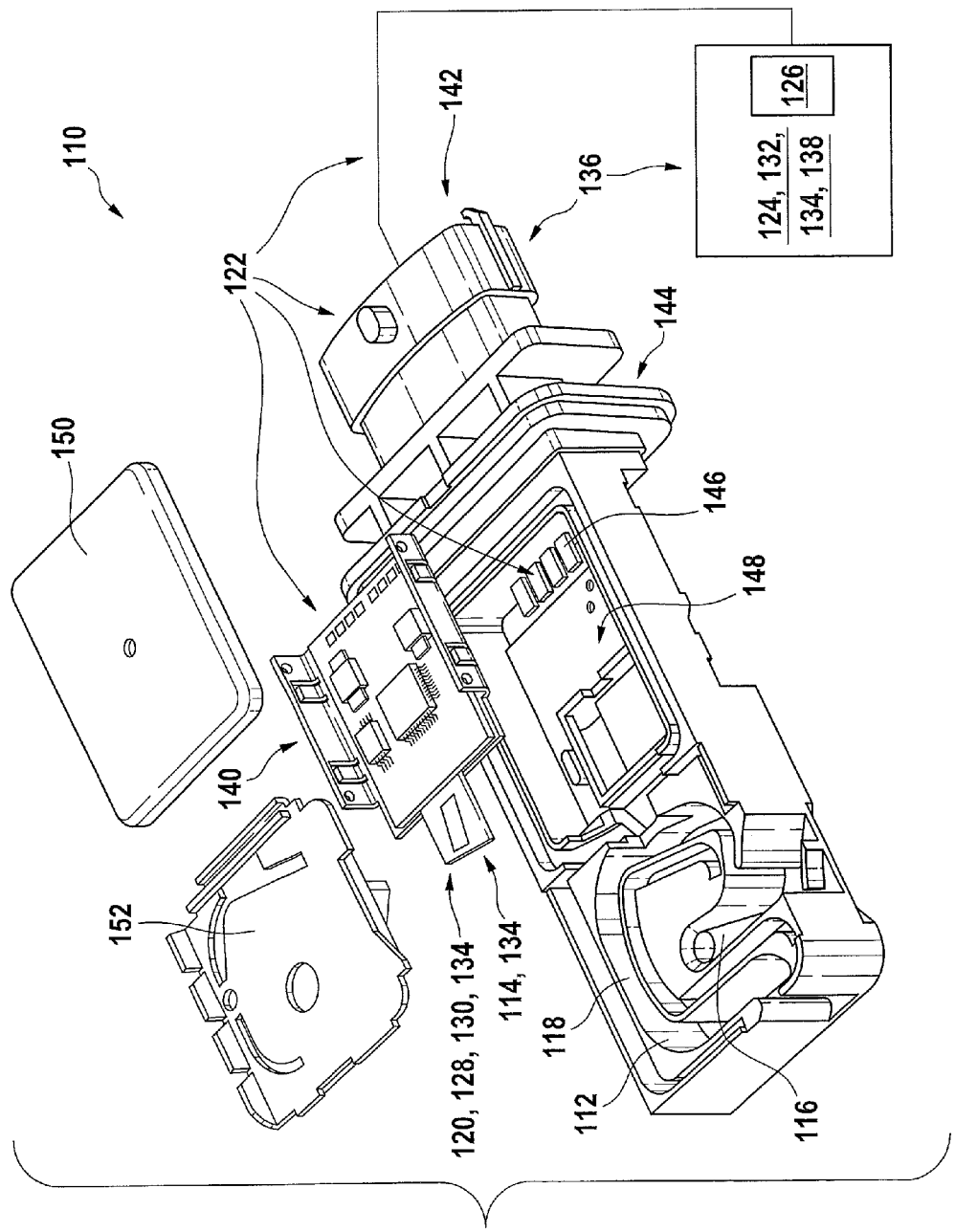

DEVICE FOR DETECTING AT LEAST ONE FLOW CHARACTERISTIC OF A FLUID MEDIUM

CROSS REFERENCE TO RELATED APPLICATION

The present application claims priority to Application No. DE 10 2012 200 121.2, filed in the Federal Republic of Germany on Jan. 5, 2012, which is incorporated herein in its entirety by reference thereto.

FIELD OF INVENTION

The present invention relates to a device for detecting at least one flow characteristic of a fluid medium, in particular for detecting an air mass flow in the intake air of a motor vehicle.

BACKGROUND INFORMATION

Numerous devices for detecting at least one flow characteristic of a fluid medium are known from the related art. The flow characteristic may in principle be an arbitrary physically and/or chemically measurable flow characteristic. In particular, the flow characteristic may be a mass flow, in particular an air mass flow, a flow velocity, and/or a volume flow. The detection may be a quantitative and/or qualitative detection. The fluid medium may be an arbitrary gas and/or an arbitrary liquid. The fluid medium may particularly preferably be an exhaust gas of an internal combustion machine. For example, the gas may also be air in an intake system of an internal combustion machine, for example, of a motor vehicle. The present invention is described in particular hereafter with reference to hot-film air flow meters, as described, for example, in Robert Bosch GmbH: Sensoren im Kraftfahrzeug [Sensors in Motor Vehicles], 2010 edition, pages 146-148. The detection of the at least one flow characteristic of the fluid medium may relate in particular to a flow rate measurement, for example, of intake air in a motor vehicle. In this case, a thermal measuring method is preferably used. The thermal measuring method is distinguished, for example, by a direct detection of the flow characteristic, in particular a sought-after measured variable, particularly preferably the air mass, in particular by high dynamic response and/or by a broad detection range, for example, of the air mass flow.

The devices known from the related art may have some disadvantages. For example, a natural sensitivity with respect to a contamination of the device, in particular of a sensor element, may be disadvantageous. In the event of a shutdown of the internal combustion machine, for example, an internal combustion engine, gases in a crankcase of the internal combustion engine may relax. The gases, in particular oil-containing gases, may reach the device, in particular the air flow meter, via a crankcase ventilation and/or an intake manifold, and may accumulate there on the sensor element, for example. This may result in a degradation of measuring accuracy, for example. To prevent this, the sensor element may be heated, for example, during the shutdown, in particular during a shutdown case, for example, by at least one chip heater, in particular to prevent oil deposits.

A method for cleaning a measuring element around which a gas flow flows, and which contains at least one heatable element, is described in German Application No. DE 102 32 072 B4. The measuring element is accommodated on a thin diaphragm material, the diaphragm material being situated so it may oscillate. Periodic energizing, which is performed at intervals, of the at least one heatable element accelerates, via a control unit or a circuit intrinsic to the measuring element, the diaphragm material, which has locally differing coefficients of thermal expansion, in the direction of the surface normal of the diaphragm material.

Devices known from the related art, as described above, mostly have multiple disadvantages, for example, inefficient operation. Therefore, a device for detecting at least one flow characteristic of a fluid medium, which has optimum control of a heating element, for example, combined with minimization of power consumption and/or with adaptation to an available electrical voltage of a voltage supply, would be desirable.

SUMMARY

Accordingly, a device for detecting at least one flow characteristic of a fluid medium, in particular for detecting an air mass flow in the intake air of a motor vehicle, is proposed. The device may in principle be understood as an arbitrary device which is designed to detect the at least one flow characteristic of the fluid medium. The detection may be, for example, a quantitative and/or qualitative detection, for example, a measurement of the flow characteristic of the fluid medium. The flow characteristic may be an arbitrary physically and/or chemically measurable flow characteristic. The flow characteristic may particularly preferably be a mass flow, in particular an air mass flow, a volume flow, an air mass velocity, and/or a gas velocity of the fluid medium. The fluid medium may in principle be an arbitrary gas and/or an arbitrary liquid. The fluid medium may particularly preferably be exhaust gas and/or intake air of an internal combustion machine.

The device includes at least one flow channel through which the fluid medium may flow and at least one sensor element situated in the flow channel for detecting the flow characteristic. The flow channel may in principle be an arbitrary device, which is designed for at least part of the fluid medium to flow through it. The flow channel may be designed in one piece, for example. However, the flow channel may also have at least one main channel and at least one bypass channel, which branches off of the main channel. The sensor element may preferably be situated in the bypass channel. The flow channel may include at least one hollow body. The sensor element may in principle be an arbitrary sensor, which is configured to detect the flow characteristic of the fluid medium. The sensor element may particularly preferably include at least one flow sensor. In particular, the sensor element may be at least one hot-film air flow meter (HFM), for example, a hot-film air flow meter chip. The sensor element may be a hot-film air flow meter, for example, as known from the related art, for example, and described in Robert Bosch GmbH: Sensoren im Kraftfahrzeug [Sensors in Motor Vehicles], 2010 edition, pages 146-148, for example. The sensor element may be accommodated in at least one sensor housing, for example, in a sensor housing which may include the flow channel, for example. The device may be designed as a plug-in probe, for example. The sensor element may be accommodated in the flow channel, for example. The sensor element may include at least one sensor chip, for example, on at least one sensor carrier, for example. The sensor element and/or the sensor chip may have at least one measuring surface, for example, in particular a measuring surface over which at least a part of the fluid medium may flow. The sensor element may include at least one hot-film air flow meter, for example. The hot-film air flow meter may include at least one silicon chip, for example. The sensor element, in particular the sensor chip, may have at least one temperature sensor mounted upstream and at least one temperature sensor mounted downstream. For example, the sensor element may include at least one sensor heating element. The device may be configured, for example, to infer the flow characteristic from signals of the temperature sensor, in particular an asymmetry of a temperature distribution around the sensor heating element. The sensor heating element may preferably be situated between the two temperature sensors. The sensor carrier and/or the sensor element may at least partially protrude into the fluid medium, for example.

The sensor element has at least one heating element. The heating element may be a device, for example, which is configured to heat at least a part of the sensor element, in particular to raise a temperature of at least a part of the sensor element. The heating element may be designed in particular to regulate, monitor and/or detect the temperature of at least a part of the sensor element. The heating element may also be the sensor heating element, for example. Alternatively or additionally, the heating element may be an additional heating element, which is not required for a sensor function, in particular for detecting the flow characteristic. The heating element may include at least one chip heater, for example. The heating element may be configured, for example, to prevent a contamination, for example, by droplet deposition. The heating element may be configured in particular to delay or prevent contamination, aging and/or damage of the sensor element.

The device includes at least one bidirectional electrical interface. The bidirectional electrical interface may be, for example, a device which is configured to transmit and/or transfer information in at least two directions. The at least one bidirectional electrical interface may preferably be precisely one interface, for example, having precisely one plug connector. The bidirectional interface may be, for example, a communication element. The bidirectional interface may include, for example, at least one electrical line. For example, the bidirectional electrical interface may include at least two electrical lines. The bidirectional electrical interface may be, for example, a device which includes at least one receiver and/or at least one transceiver. For example, a transmission of information in at least two directions, for example, simultaneously or in only one direction at a time, may be made possible through the bidirectional electrical interface. For example, the bidirectional interface may include at least one data bus and/or at least one data bus system. For example, the bidirectional electrical interface may be configured to communicate between at least two parts of the device, between at least two elements and/or between the device and another device.

The device is configured to receive information and transmit information via the bidirectional electrical interface. The information may be understood, for example, as physical and/or logical variables. The information may particularly preferably be electronic signals, for example, measuring data and/or control signals. For example, the information may be data. The bidirectional electrical interface may be, for example, an analog bidirectional electrical interface or a digital bidirectional electrical interface. The bidirectional electrical interface may be, for example, a data interface, a hardware interface, a network interface and/or a software interface. For example, the bidirectional electrical interface may be a USB interface. For example, the bidirectional electrical interface may be a parallel bidirectional electrical interface and/or a serial bidirectional electrical interface.

The bidirectional electrical interface may be connectable to at least one control unit, for example. The control unit may be an arbitrary device, for example, which is configured to control and/or analyze the detection of the at least one flow characteristic of the fluid medium. For example, the control unit may also be designed to control, analyze, calibrate and/or monitor an arbitrary function of the device. The control unit may be an engine control unit, for example. The control unit may be included by the device, for example, but may also be designed separately, for example. The control unit may include at least one data processing device and/or at least one controller, for example. Furthermore, the control unit may include at least one application device for applying electrical voltage and/or electrical current to the device.

The control unit may preferably include at least one analysis circuit. The analysis circuit and/or the control unit may be electronic circuits in particular. The analysis circuit may particularly preferably be an electronic circuit for activating the device and/or for at least partially analyzing sensor signals. The sensor signals may be, for example, a signal of the sensor element, a signal of the heating element and/or a signal of another sensor of the device. The control unit and/or the analysis circuit may include, for example, at least one regulator, for example, at least one PID regulator, and/or at least one analysis program, for example, including an analysis algorithm.

The heating element may be configured, for example, to heat the sensor element in such a way that a deposit of contaminants on the sensor element may be at least reduced. The heating element may be configured in particular to at least partially prevent or reduce oil deposits on the sensor element, in particular when the device is in an operating mode in which the flow characteristic is not detected.

The device may include at least one state sensor for detecting at least one state of the sensor element, in particular at least one temperature sensor. The state sensor may in principle be an arbitrary sensor which is configured to detect a state of the sensor element, the device and/or surroundings of the sensor element and/or the device. The state sensor may be, for example, at least one temperature sensor, at least one pressure sensor, at least one humidity sensor, at least one voltmeter, at least one ammeter, at least one ohmmeter, at least one flow sensor different from the sensor element, at least one lambda sensor, at least one gas sensor and/or at least one spectroscope. The state sensor may in particular be a sensor which is not configured to detect the flow characteristic of the fluid medium. The state sensor may in particular be a sensor which is not part of the sensor element. The state of the sensor element may be, for example, at least one temperature of at least one part of the sensor element. For example, the state of the sensor element may also be a composition and/or a proportion of a gas component of the fluid medium. For example, the state of the sensor element may also be a temperature of the fluid medium. The state of the sensor element may be, for example, at least a humidity, for example, an air humidity of the fluid medium, for example, in or on the sensor element. Furthermore, the state of the sensor element may be at least one pressure, for example, an air pressure on or in the sensor element and/or on or in the device. For example, the state sensor may also be designed to detect at least one state of the device and/or one state of a surroundings of the device. The temperature sensor may in particular be a device which is configured to detect a temperature of the sensor element and/or a temperature of the fluid medium on or in the sensor element. The temperature sensor may be at least one resistive temperature sensor, for example. The state sensor may also be at least partially included by the control unit and/or by the analysis circuit, for example. The state sensor may be connected, for example, by the bidirectional electrical interface to the sensor element, to the analysis circuit and/or to the engine control unit and/or may transmit, receive and/or exchange information.

The device may be configured, for example, to transmit the state, which is detected with the aid of the state sensor, of the sensor element, the device, the surroundings of the device and/or the surroundings of the sensor element via the bidirectional electrical interface to at least one external device connected to the device via the bidirectional electrical interface, in particular to a control unit, for example, a control unit as described above. Furthermore, the device may be configured to receive at least one signal from the external device via the bidirectional electrical interface and to activate at least one element of the device, in particular the heating element, in accordance with this signal. The external device may in particular be a device which is not included by the device according to the present invention. In principle, the external device may also be a device which is included by the device according to the present invention, however. The external device may be, for example, the control unit, the analysis circuit, another data processing device, an engine control unit, at least one regulator, and/or another electrical and/or electronic circuit. The signal may be, for example, the information, measurement data, control signals and/or data. For example, the signal may be electrical and/or electronic signals. This signal may be an analog signal or a digital signal, for example. For example, the signal may be a temperature and/or it may include at least one item of information about a temperature, for example, an analog signal or digital signal. The signal may also include a temperature curve, for example. The element of the device may in principle be an arbitrary element of the device according to the present invention. For example, the element of the device may be the heating element, the sensor heating element, the chip heater, the first temperature sensor, the second temperature sensor, the application device and/or the regulator. For example, the signal may initially be analyzed, processed and/or calculated on a controller of the element of the device and/or on the control unit. For example, the signal may be subjected to an algorithm. For example, at least one interfering signal for activating the element of the device may be generated from the signal. For example, an optimization may be carried out with the aid of the control unit, for example, in such a way that the element of the device is activated in accordance with the signal in such a way that the device is optimally operated, for example, with respect to power supply aspects and/or with respect to a measuring accuracy.

The sensor element, in particular the flow sensor, may be situated, for example, on at least one sensor carrier, for example, an electronic module. The electronic module may be designed in one piece, for example. The electronic module may include in particular at least one activation circuit and/or at least one analysis circuit, for example, which may be configured to activate the sensor element and/or to record signals of the sensor element. The electronic module may have at least one circuit carrier, for example. Furthermore, the electronic module may have at least one sensor carrier, which is or may be connected, preferably mechanically, to the circuit carrier. For example, the circuit carrier may be situated in an electronic space of a sensor housing. The sensor housing and/or the electronic space may have at least one electronic space cover, in particular to at least partially close the electronic space reversibly or irreversibly. The sensor carrier, preferably having the sensor element, may protrude out of the electronic space into the fluid medium. The fluid medium may in particular be a flowing fluid medium. The circuit carrier of the electronic module may include at least one circuit board, for example, which may be used alone, for example, but which may also be installed on a mechanical carrier, for example, made of a metallic material, for example. The sensor carrier may be directly connected to the circuit carrier and/or may also be connected to the carrier part. Other embodiments are also possible. It is thus conceivable, for example, that the electronic module may be produced from at least one circuit board material, both the circuit carrier and the sensor carrier being able to be produced from the circuit board material, preferably from one piece of the circuit board material. Alternatively or additionally, it is also possible to use injection-molded circuit boards known from the related art as the electronic module. Various embodiments are in principle conceivable. The sensor housing may have at least one opening. The opening may be configured in particular to apply the fluid medium to the flow channel. The opening may in principle be an element of the sensor housing, which is configured to allow a through flow of at least a part of the fluid medium through the opening.

In another aspect of the present invention, a sensor device is described. The sensor device includes at least one device as described above, in particular the device according to the present invention. The sensor device also includes the at least one control unit, in particular the engine control unit. The control unit is connected to the bidirectional electrical interface of the device. The device is configured to exchange information bidirectionally with the control unit.

In another aspect of the present invention, a method for operating a device is described. The device is a device as described above, in particular the device according to the present invention. The method includes at least two operating modes. The device is operated in the operating modes with the aid of the bidirectional electrical interface. An operating mode may be understood, for example, as a type of operation of the device according to the present invention and/or the sensor device according to the present invention. The type of operation may be understood, for example, as a type of activation of the device according to the present invention and/or the sensor device according to the present invention. The two operating modes may differ in particular through at least one feature. The feature of an operating mode may be an application of at least one electrical voltage and/or at least one electrical current to at least a part of the device and/or the sensor device, in particular at a level of an electrical current and/or a level of an electrical voltage. For example, the feature of an operating mode may also be at least one temperature of at least a part of the device according to the present invention and/or the sensor device according to the present invention. The operating modes may differ, for example, with respect to their duration. The operating modes may be carried out successively, for example, or may also be at least partially carried out simultaneously, for example. For example, the two operating modes may also take turns, for example, alternately. Particularly preferably, an operating mode may include at least one cycle, a cycle being able to include an arrangement with respect to time, preferably a periodically repeating arrangement, of control signals, trigger signals and/or operating phases, preferably for various components of the device. For example, at least one third operating mode may be carried out between the two operating modes. For example, further additional operating modes may be carried out. A sequence of the operating modes may in principle be freely selected, for example, by the control unit and/or by the analysis circuit.

The two operating modes may be selected, for example, from the group including:

a measuring operating mode, for example, the flow characteristic of the fluid medium being able to be detected in the measuring operating mode;

a standby mode, for example, at least one element of the device, preferably the controller, being able to be operated in the standby mode, in particular at least one voltage and/or at least one current being able to be applied thereto, the flow characteristic of the fluid medium preferably not being detected in the standby mode, however, at least one other electrical function of the device and/or the sensor device being able to be activated; and a protective heating mode, the at least one heating element of the device and/or the sensor device being able to be activated in the protective heating mode, for example, to heat the sensor element and/or to at least partially reduce a deposit of contaminants on the sensor element, no detection of the flow characteristic preferably taking place in the protective heating mode.

The measuring operating mode, the standby operating mode and/or the protective heating mode may in principle be operating modes of the method according to the present invention. Features of the mentioned operating modes may in principle also be included in other particular operating modes. The method may in principle also include additional operating modes.

Via the bidirectional electrical interface, the device and/or the sensor device may be connected, for example, to at least one control unit, for example, a control unit as described above. The control unit may select the operating mode, for example. The control unit may select the operating mode, for example, in particular as a function of at least one parameter transmitted to the control unit from the device via the bidirectional electrical interface. The parameter may include at least one state of the device, the sensor device and/or the sensor element. The state may be defined as described above, for example. The control unit may be designed, for example, as described above. The parameter may in principle be an arbitrary parameter, which may describe the device, the sensor device, the sensor element and/or at least a part of the mentioned elements, in particular may describe them technically, mathematically and/or electronically. The expression "are connected" may be understood, for example, as an establishment of an electrical connection and/or a connection for signal transmission and/or for signal reception.

The above-described device, the above-described sensor device and/or the above-described method may have numerous advantages in relation to known devices, sensor devices, and methods. For example, the device according to the present invention, the sensor device according to the present invention and/or the method according to the present invention may offer optimum control of a heating procedure, in particular a heating procedure by the heating element, for example, a chip heating procedure, in particular with the aid of the bidirectional electrical interface to the engine control unit, for example, a bidirectional interface, in particular with minimization of a power consumption of the sensor element, in particular the air flow meter, and/or an adaptation of an operation of the heating element, in particular a chip heating operation, for example, to an available electrical power of a voltage supply and/or current supply. For example, the present invention may offer a controller of the sensor element, in particular the air flow meter, for example, from an engine control unit, preferably without additional wiring, in particular through the use of the bidirectional electrical interface, in particular in a shutdown case of the engine, for example, in start-stop operation. For example, the present invention may be used for the purpose of saving electrical current and/or power. Furthermore, the device according to the present invention and/or the sensor device according to the present invention may be operationally ready in an extremely short time when it is put into operation, for example. Display errors of the device and/or the sensor device, in particular of an air mass flow, due to strong intrinsic heating of the sensor element using a turned-on heater, in particular using a turned-on heating element without air flow, may be avoided, for example. The present invention may offer a safeguard against the deposit of oil, for example, from oil vapors, on the sensor element, in particular on the sensor element of the air flow meter, for example, by activation of the protective heater, in particular by activation of the heating element.

The operating modes may be and/or will be selected in particular in such a way that a power consumption may be minimized while still having a sufficient protective effect.

Further optional details and/or features of the present invention result from the following description of preferred exemplary embodiments, which are schematically shown in the figure.

BRIEF DESCRIPTION OF THE DRAWING

FIG. 1 shows an exemplary embodiment of a device according to the present invention for detecting at least one flow characteristic of a fluid medium.

DETAILED DESCRIPTION

FIG. 1 shows an exemplary embodiment of a sensor device 136 according to the present invention and/or a device 110 according to the present invention. Device 110 according to the present invention is a device 110 for detecting at least one flow characteristic of a fluid medium, in particular for detecting an air mass flow in the intake air of a motor vehicle. Device 110 includes at least one flow channel 112, through which the fluid medium may flow, and at least one sensor element 114, which is situated in flow channel 112, for detecting the flow characteristic. Flow channel 112 may include, for example, at least one main channel 116 and/or at least one bypass channel 118. Sensor element 114 has at least one heating element 120. Heating element 120 may be, for example, a sensor heating element, the sensor heating element being configured to detect the flow characteristic of the fluid medium. For example, heating element 120 may also be an additional heating element 120, however, which is particularly preferably not required for sensor functions, and which may be used, for example, as a chip heater to prevent contamination, for example, by droplet deposition.

Device 110 includes at least one bidirectional electrical interface 122. Device 110 is configured to receive information and transmit information via bidirectional electrical interface 122.

Bidirectional electrical interface 122 may be connectable to at least one control unit 124. Control unit 124 may include at least one analysis circuit 126. Control unit 124 and/or analysis circuit 126 may include, for example, at least one data processing device and/or at least one controller.

Heating element 120 may be configured, for example, to heat sensor element 114 in such a way that a deposit of contaminants on sensor element 114 and/or on device 110 may be at least reduced. Device 110 may include at least one state sensor 128 for detecting at least one state of sensor element 114, device 110 and/or sensor device 136. State sensor 128 may in particular be at least one temperature sensor 130. Device 110 may be configured to transmit the state, which is detected with the aid of state sensor 128, of sensor element 114, device 110, a surroundings of device 110 and/or sensor device 136, and/or the fluid medium via bidirectional electrical interface 122 to at least one external device 132, which is connected to device 110 via bidirectional electrical interface 122. External device 132 may be, for example, a device which is included by device 110. For example, external device 132 may also be a device which may be designed separately from device 110 according to the present invention. External device 132 may be, for example, control unit 124. Device 110 may also be configured to receive at least one signal from external device 132 via bidirectional electrical interface 122 and to activate at least one element 134 of device 110, in particular heating element 120, in accordance with this signal. Element 134 of device 110 may also be, for example, sensor element 114 or another element of device 110.

Device 110 may be designed, for example, as a plug-in probe. For example, as shown in FIG. 1, at least one end of device 110 may have a plug area 142. Furthermore, device 110 may include at least one device housing 144, in particular designed as a plug-in probe, for example, as the housing. Furthermore, device 110 may include printed conductors 146, which may be included by bidirectional electrical interface 122, but which may also be designed separately. Printed conductors 146 may be designed in particular for applying electrical current and/or electrical voltage to device 110. For example, printed conductors 146 may also be designed to conduct electrical current and/or information from bidirectional electrical interface 122 to a further component of device 110, for example, to electronic module 140. Electronic module 140 may include, for example, at least one floor plate, at least one sensor carrier, for example, a sensor carrier made of metal, at least one circuit board and/or sensor element 114. Device 110 may in particular include an electronic space 148, which may at least partially enclose electronic module 140. Electronic space 148 may be at least partially closed and/or covered, preferably reversibly, by an electronic space cover 150, for example. Flow channel 112, in particular bypass channel 118 and/or main channel 116, may preferably be closed and/or covered by at least one measuring channel cover 152, for example, a bypass channel cover.

In addition to an exemplary embodiment of a device 110 according to the present invention, in particular in a perspective exploded view, FIG. 1 partially schematically shows an exemplary embodiment of a sensor device 136 according to the present invention, including at least device 110, as described above, for example.

Sensor device 136 also includes at least control unit 124. Control unit 124 may be designed as an engine control unit 138, for example. Control unit 124 of sensor device 136 is connected to bidirectional electrical interface 122 of device 110, device 110 being configured to exchange information bidirectionally with control unit 124, for example, with engine control unit 138. "Bidirectional" may be understood within the scope of the present invention in particular to mean that information may be both transmitted and received. In particular, "bidirectional" within the scope of the present invention may include an information flow in at least two directions.

An exemplary embodiment of a method for operating a device 110 as described above is described hereafter. The method includes at least two operating modes. Device 110 is operated in the operating modes with the aid of bidirectional electrical interface 122. The two operating modes may be selected from the group including:

a measuring operating mode, for example, the flow characteristic of the fluid medium being able to be detected in the measuring operating mode;

a standby mode, for example, at least one element 134 of device 110, preferably a controller, for example, control unit 124, being able to be operated in the standby mode, the flow characteristic of the fluid medium preferably not being detected in the standby mode, however, at least one other electrical function of device 110 being able to be activated; and a protective heating mode, the at least one heating element 120 of device 110 being able to be activated in the protective heating mode, for example, to heat sensor element 114 and to at least partially reduce a deposit of contaminants on sensor element 114.

For example, during a shutdown of the internal combustion device, for example, the internal combustion engine, engine control unit 138, for example, control unit 124, may still be active for a certain period of time. For example, control unit 124, for example, engine control unit 138, may alternatively or additionally be active in the case of so-called start-stop operation, in particular in the stop phase. Since in this period of time typically no fresh air is supplied to the internal combustion machine and/or the internal combustion engine, for example, sensor element 114, in particular the air flow meter, may be turned off, for example, to save power and/or to be put into another operating mode, for example, if oil vapors occur on heating element 120, for example, a protective heater may be activated. In general, a sensor device 136, for example, also known from the related art, may be easily turned off by interrupting a power supply. When it is turned on again, which may be required as rapidly as possible in the case of start-stop operation, for example, there are time lapses in the devices, sensor devices and/or methods known from the related art, however, since currently used digital electronics must be activated and/or since heating element 120 of the air flow meter must bring the air flow meter to operating temperature, for example. Therefore, it may be advantageous, for example, to only put sensor element 114 in the standby mode according to the method according to the present invention. In the standby mode, for example, heating element 120, in particular a heater of the air flow meter, may be turned off, for example, an electrical monitoring circuit, for example, control unit 124, analysis circuit 126, engine control unit 138 and/or electronic module 140 remaining active. In this way, for example, power may be saved, in particular electrical current, and/or sensor element 114 and/or device 110 may be operationally ready again within an extremely short time, in particular for the measuring operating mode, for example, for detecting the flow characteristic. Furthermore, in particular through the standby mode, display errors of the air mass flow due to strong intrinsic heating of sensor element 114 and/or device 110 using turned-on heating element 120 without air flow may be avoided, for example. To activate the standby mode, for example, bidirectional electrical interface 122, an additional signal line and/or another line, for example, a measuring signal line, may be used for a signal transmission. Bidirectional interface 122 may particularly preferably be used for the activation. A signal transmission concept employing bidirectional electrical interface 122 may be particularly favorable. For example, during the standby mode, for example, a standby state, information, for example, at least one temperature of sensor element 114, may be transmitted to engine control unit 138, to control unit 124 and/or to analysis circuit 126. During the protective heating mode, for example, as a safeguard against the deposit of oil from oil vapors on sensor element 114, for example, the air flow meter, a heating element 120, in particular a protective heater, may be activated. In this case, sensor element 114, preferably together with a substrate including sensor element 114, may be regulated to a predefined overtemperature, for example, to prevent condensation of oil on sensor element 114. Measures, as above in the standby mode, may be applied to activate this protective function. For example, the protective function may be activated via an air mass flow measuring signal line. With the aid of bidirectional electrical interface 122, it may be possible, for example, to detect an instantaneous temperature of at least a part of sensor element 114 and/or device 110 and to change a predefined overtemperature, for example.

The operating modes may be selected, for example, in particular by control unit 124, analysis circuit 126, engine control unit 138 and/or electronic module 140, in such a way that a power consumption may be minimized while still having a sufficient protective effect, for example, by an adaptation of the overtemperature in the protective heating mode, in particular in protective heating operation, and/or a power consumption may be adapted to an available electrical power. For example, a minimal power consumption may be implemented by the present invention having a maximum safeguard in the case of low available electrical power.

With the aid of bidirectional electrical interface 122, the various operating modes of sensor element 114, in particular of the air flow meter, for example, may be set flexibly, for example, the measuring operating mode, in particular a measuring operation, the standby mode, in particular standby, and/or the protective heating mode, in particular the protective heating. For example, a selection may be made between the various operating modes, for example, between the standby mode and the protective heating mode, according to various criteria. Via bidirectional electrical interface 122, device 110 may be connected to the at least one control unit 124, to analysis circuit 126, to engine control unit 138 and/or to electronic module 140. Preferably, control unit 124, analysis circuit 126, engine control unit 138 and/or electronic module 140 may select the operating mode, in particular as a function of at least one parameter transmitted from device 110 via bidirectional electrical interface 122 to control unit 124, optionally analysis circuit 126, engine control unit 138 and/or electronic module 140. The parameter may include at least one state of device 110. An analysis of the parameter may be incorporated in the criteria, for example. The criteria and/or the parameter may be a prior history of the operation of device 110, for example, in particular the engine operation, for example, operation at particularly high temperatures and/or at particularly low temperatures, the temperatures being able to be detected, for example, by state sensor 128, in particular by temperature sensor 130. For example, heating may initially be performed during a stop phase, in particular by heating element 120, particularly preferably in the protective heating mode, and it may then be switched over into the standby mode, for example, standby operation. Bidirectional electrical interface 122 may include in particular wiring from device 110 to engine control unit 138 and/or to analysis circuit 126. For example, the present invention may be applied for a measurement of intake air in motor vehicles, in particular in thermal air flow meters, which may offer special operating options, in particular operating modes, in a shutdown case, for example.

What is claimed is:
1. A device for detecting at least one flow characteristic of a fluid medium comprising:
at least one flow channel, through which the fluid medium may flow in a direction of flow;
at least one sensor element, which is situated in the flow channel, for detecting the flow characteristic, the sensor element having at least one heating;
at least one state sensor for detecting at least one state of the sensor element;
at least one bidirectional electrical interface, the device being configured to receive information and transmit information via the bidirectional electrical interface; and
a connection to at least one control unit located in at least one external device;
wherein the heating element is regulated by the at least one control unit,
a heating temperature is selected by the at least one control unit based on an operating mode of the device that is selected or detected by the at least one control unit,
an activation of the heating element, an activation of the state sensor, and an activation of the sensor element are independently controlled by the at least one control unit,
the heating element heats the fluid medium in the flow channel that is in the vicinity of the sensor element,
the device is configured to detected the state of the sensor element with the aid of the state sensor and transmit the state of the sensor element via the bidirectional electrical interface to the at least one external device, the external device being connected to the device via the bidirectional electrical interface,
the device is configured to receive at least one signal from the at least one external device via the bidirectional electrical interface and to activate the heating element of the device in accordance with the received signal,
when the operating mode is a standby mode, the state sensor is configured to detect the state of the sensor element and transmit the state of the sensor element to the at least one external device via the bidirectional interface, and
when the operating mode is the standby mode, the sensor element is configured to not detect the flow characteristic.

2. The device according to claim 1, wherein the bidirectional electrical interface is connectable to the at least one control unit.

3. The device according to claim 2, wherein the at least one control unit includes at least one analysis circuit.

4. The device according to claim 1, wherein the heating element is configured to heat the sensor element such that a deposit of contaminants on the sensor element is at least reduced.

5. The device according to claim 1,
wherein the at least one state sensor is at least one temperature sensor.

6. A method for operating a device for detecting at least one flow characteristic of a fluid medium, the device comprising:
at least one flow channel, through which the fluid medium may flow in a direction of flow;
at least one sensor element, which is situated in the flow channel, for detecting the flow characteristic, the sensor element having at least one heating element wherein an activation of the heating element and an activation of the sensor element are independently controlled, and the heating element heats the fluid medium in the flow channel that is in the vicinity of the sensor element; and
at least one bidirectional electrical interface, the device being configured to receive information and transmit information via the bidirectional electrical interface;

the method comprising:
  operating the device in at least three operating modes with the aid of the bidirectional electrical interface,
  selecting a temperature based on the operational mode, and
  heating the heating element to the temperature,
  wherein the three operating modes are selected from the group consisting essentially of:
    a measuring operating mode, the flow characteristic of the fluid medium being detected in the measuring operating mode;
    a standby mode, at least one control unit of the device being operated in the standby mode, the flow characteristic of the fluid medium preferably not being detected in the standby mode, however, at least one other electrical function of the device being activated; and
    a protective heating mode, the at least one heating element of the device being activated in the protective heating mode to heat the sensor element and to at least partially reduce a deposit of contaminants on the sensor element.

7. The method according to claim 6, further comprising:
  connecting the device to at least one control unit via the bidirectional electrical interface; and
  selecting, by the control unit, the operating mode as a function of at least one parameter transmitted from the device via the bidirectional electrical interface to the control unit, the parameter including at least one state of the device.

\* \* \* \* \*